United States Patent
Liao et al.

(10) Patent No.: US 10,791,271 B1
(45) Date of Patent: Sep. 29, 2020

(54) OBTAINING STABLE FRAMES

(71) Applicant: Alibaba Group Holding Limited, George Town (KY)

(72) Inventors: Genggeng Liao, Hangzhou (CN); Qiheng Song, Hangzhou (CN); Quanshui Ming, Hangzhou (CN); Jian Zhou, Hangzhou (CN); Hui Zheng, Hangzhou (CN); Qinzhong Wang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/801,998

(22) Filed: Feb. 26, 2020

Related U.S. Application Data

(63) Continuation of application No. PCT/CN2020/071690, filed on Jan. 13, 2020.

(30) Foreign Application Priority Data

Jul. 17, 2019 (CN) .......................... 2019 1 0647476

(51) Int. Cl.
*H04N 5/232* (2006.01)
*G06T 7/70* (2017.01)
(Continued)

(52) U.S. Cl.
CPC .......... *H04N 5/23264* (2013.01); *G06T 7/70* (2017.01); *H04N 7/188* (2013.01); *G06K 9/03* (2013.01); *G06T 2207/10016* (2013.01)

(58) Field of Classification Search
CPC ...... H04N 5/23264; H04N 7/188; G06T 7/70; G06T 2207/10016; G06K 9/03
See application file for complete search history.

(56) References Cited

U.S. PATENT DOCUMENTS 7,432,953 B2 * 10/2008 Washisu ............... H04N 5/2253
348/208.11
10,535,146 B1 * 1/2020 Buibas ............... G06K 9/00201
(Continued)

FOREIGN PATENT DOCUMENTS

| CN | 104349039 | 2/2015 |
| CN | 104601918 | 5/2015 |

(Continued)

OTHER PUBLICATIONS

PCT International Search Report and Written Opinion in International Application No. PCT/CN2020/071690, dated Apr. 21, 2020, 18 pages (with machine translation).

(Continued)

*Primary Examiner* — Maria E Vazquez Colon
(74) *Attorney, Agent, or Firm* — Fish & Richardson P.C.

(57) ABSTRACT

Implementations of the present application provide a solution for obtaining a stable frame. In the solution, a video stream is obtained, from which a first and second stable frame are determined using at least position-based offset values between one or more frames. The first and second stable frames correspond to a first time interval and second time interval, respectively. The first time interval corresponds to a time before a first vibration is generated by opening a door of a visual vending machine. The second time interval corresponds to a time after the first vibration and before a second vibration generated by closing the door. The two stable frames can be used for image recognition within the visual vending machine to improve accuracy of product recognition.

20 Claims, 4 Drawing Sheets

(51) Int. Cl.
*H04N 7/18* (2006.01)
*G06K 9/03* (2006.01)

(56) References Cited

U.S. PATENT DOCUMENTS

| | | |
|---|---|---|
| 2005/0152450 A1 | 7/2005 | Ueno et al. |
| 2010/0094457 A1* | 4/2010 | Garson .................. G06F 17/00 700/242 |
| 2010/0237091 A1* | 9/2010 | Garson .................. G07F 9/026 221/226 |
| 2013/0134178 A1* | 5/2013 | Lu .......................... G07F 9/026 221/1 |
| 2017/0004472 A1* | 1/2017 | Tkachenko ............. G06Q 20/18 |
| 2017/0311037 A1* | 10/2017 | Ohmura ............. H04N 21/4621 |
| 2020/0014856 A1* | 1/2020 | Asanuma ........... H04N 5/23206 |
| 2020/0019921 A1* | 1/2020 | Buibas ..................... G06T 7/74 |

FOREIGN PATENT DOCUMENTS

| | | |
|---|---|---|
| CN | 109508621 | 3/2019 |
| CN | 110490075 | 11/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

\* cited by examiner

OBTAINING STABLE FRAMES

CROSS-REFERENCE TO RELATED APPLICATIONS

This application is a continuation of PCT Application No. PCT/CN2020/071690, filed on Jan. 13, 2020, which claims priority to Chinese Patent Application No. 201910647476.7, filed on Jul. 17, 2019, and each application is hereby incorporated by reference in its entirety.

TECHNICAL FIELD

The present application relates to the field of information technologies, and in particular, to methods and devices for obtaining a stable frame and a computer readable medium.

BACKGROUND

The basic principle of a visual vending machine is to take two pictures when a user opens or closes the door of the virtual vending machine, and compare the two obtained pictures to find their difference values, to find out what product the user has taken.

SUMMARY

In an implementation of the present application, a method for obtaining a stable frame is provided, where the method is applied to a visual vending machine and includes: obtaining a to-be-processed video stream, where the video stream includes a plurality of video frames; determining, based on position offset values between a video frame and adjacent video frames, a first stable frame from video frames corresponding to a first time interval before a vibration is generated by opening the door; and determining, based on a position offset value between a video frame and the first stable frame, a second stable frame from video frames corresponding to a second time interval before a vibration is generated by closing the door.

In an implementation of the present application, a device for obtaining a stable frame is further provided, where the device is applied to a visual vending machine and includes: a data acquisition module, configured to obtain a to-be-processed video stream, where the video stream includes a plurality of video frames; and a video processing module, configured to: determine, based on position offset values between a video frame and adjacent video frames, a first stable frame from video frames corresponding to a first time interval before a vibration is generated by opening the door; and determine, based on position offset values between a video frame and adjacent video frames, a second stable frame from video frames corresponding to a second time interval before a vibration is generated by closing the door.

In some implementations of the present application, a computing device is further provided, where the device includes: a memory, configured to store computer program instructions, and a processor, configured to execute the computer program instructions, where when the computer program instructions are executed by the processor, the device is triggered to perform the previous method for obtaining a stable frame.

In some implementations of the present application, a computer readable medium is further provided, where the computer readable medium stores computer program instructions, and the computer program instructions can be executed by a processor to implement the previous method for obtaining a stable frame.

In the solutions provided in the implementations of the present application, first, a to-be-processed video stream is obtained, where the to-be-processed video stream includes a plurality of video frames; a first stable frame with a smallest position offset value is determined, based on position offset values between a video frame and adjacent video frames, from video frames corresponding to a first time interval before a vibration is generated by opening the door, where the first stable frame with a smallest position offset value is a clear picture taken before the door of the virtual vending machine is opened; and a second stable frame with a smallest position offset value is determined, based on position offset values between a video frame and adjacent video frames, from video frames corresponding to a second time interval before a vibration is generated by closing the door, where the first stable frame with a smallest position offset value is a clear picture taken before the door of the virtual vending machine is closed. Two stable frames are pictures used for image recognitions, so that the clarity of the pictures is not affected by the door vibration generated when the door is opened or closed, and the accuracy of product recognition is improved. In addition, hardware modification is not required, so that the hardware costs are reduced.

BRIEF DESCRIPTION OF DRAWINGS

Other features, objectives, and advantages of the present application will become more clear by reading the detailed description of the non-limiting implementations with reference to the following accompanying drawings.

Same or similar reference numerals in the accompanying drawings represent identical or similar components.

DESCRIPTION OF IMPLEMENTATIONS

Figure 1:
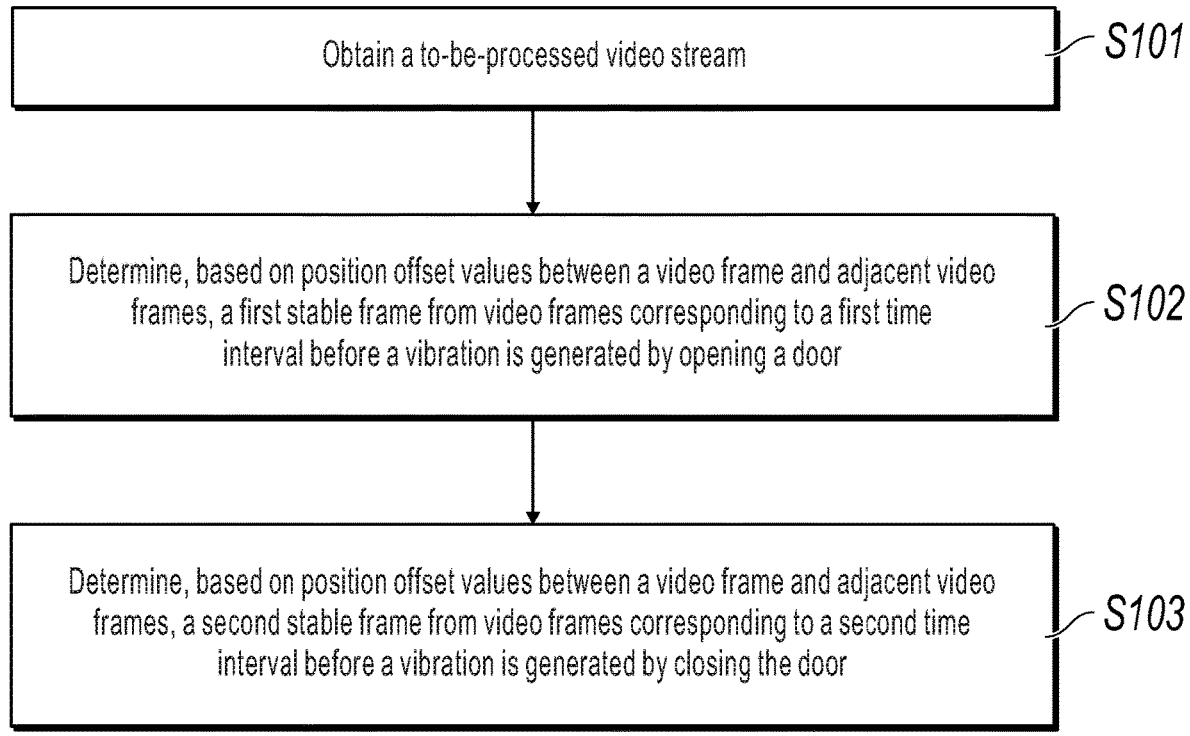
FIG. 1 is a flowchart illustrating a method for obtaining a stable frame, according to an implementation of the present specification.

The present application is further described in detail below with reference to the accompanying drawings.

In a typical configuration of the present application, the involved device can include one or more processors (CPUs), input/output interfaces, and memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program device, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible to a computing device.

The visual vending machine basically includes a large glass and a frame, the mass of the door is relatively large, and therefore the visual vending machine is likely to vibrate significantly when the door is opened or closed. As a result, the camera device installed on the visual vending machine will also have a significant vibration, and the taken pictures are blurred or a ghosting effect is caused. Consequently, the result of image recognition is affected, and the product recognition error rate is high.

The existing solutions mainly focus on hardware-based vibration resistance, for example, 1. Reducing the angle of the door closer of the visual vending machine, to reduce the force applied to close the door; 2. Using big casters to support the visual vending machine, to improve stability; and 3. Placing the cabinet of the visual vending machine against a wall, and adding a vibration-resistant foam between the visual vending machine and the wall. These solutions are both hardware modifications. On one hand, hardware costs are increased, on the other hand, because the resistance is only reduced to a certain level, clarity of the taken picture is still affected when the door of the virtual vending machine is opened or closed. This application discusses a software approach.

An implementation of the present application provides a method for obtaining a stable frame. In this method, hardware of a visual vending machine does not need to be modified, and only a manner of obtaining pictures for image recognition is changed. In a captured video stream, two stable frames that are respectively captured before the door of the visual vending machine is opened and closed are used as the pictures for image recognition, so that the clarity of the pictures is not affected by the door vibration generated when the door is opened or closed, and the accuracy of product recognition is improved. In addition, hardware modification is not required, so that the hardware costs are reduced.

In an actual scenario, the execution device of the previous method can be any device that has a data processing function, for example, a processor, a processing chip, a processing module, etc. of a visual vending machine. The execution device can obtain a video stream from a camera device of the visual vending machine, extract a stable frame for image recognition from the camera device, and provide the video frame to a product recognition module on the visual vending machine, so as to implement normal functions of the visual vending machine.

FIG. 1 is a flowchart illustrating a method for obtaining a stable frame, according to an implementation of the present specification. The method includes at least the following steps:

Step S101: Obtain a to-be-processed video stream. The to-be-processed video stream can be video data captured by a camera device on a visual vending machine, and includes a plurality of video frames. A video frame refers to a picture related to time information, and a plurality of consecutive video frames form a video stream. For example, if the frame rate of the video stream is 25 FPS, it indicates that the video stream includes 25 video frames per second, with an interval of 0.04 seconds between video frames.

Because the objective of the present implementation is to obtain a stable frame for image recognition, the to-be-processed stream also needs to include pictures applicable for image recognition, that is, two pictures can be compared to determine the product that the user has taken. Based on the conventional usage of the visual vending machine, a picture before and after the user opens the door of the visual vending machine can be captured, and other pictures before and after the user closes the door of the visual vending machine can be captured; and then the two pictures can be compared to determine the product that the user has taken. As such, the to-be-processed video stream needs to include at least video frames corresponding to the time interval before and after the user opens the door of the visual vending machine and another video frame corresponding to the time interval before and after the user closes the door of the visual vending machine, so as to obtain two recognition pictures (that is, a first stable frame and a second stable frame).

Step S102: Determine, based on position offset values between a video frame and adjacent video frames, a first stable frame from video frames corresponding to a first time interval before a vibration is generated by opening the door. After the user opens the door of the visual vending machine, the door will vibrate because of the contact with the cabinet of the visual vending machine, and then the camera device on the visual vending machine will vibrate, and consequently, the position of the captured video frame will be different. The position offset value is a value representing a position difference value between two video frames. A larger position offset value between video frames indicates a stronger vibration of the camera device; and in this case, the clarity of the captured video frames is decreased accordingly. As such, the first stable frame can be selected from the video frames captured in a period before a vibration is generated by opening the door, to ensure clarity of the picture.

In an actual scenario, in addition to opening or closing of a door, the visual vending machine also vibrates due to other reasons, for example, when a large vehicle is passing by, when the wind is strong, etc. Therefore, when the first stable frame is determined from the video frames corresponding to the first time interval before a vibration is generated by opening the door, a video frame with a smallest offset value between the video frame and adjacent video frames can be selected as the first stable frame.

Step S103: Determine, based on position offset values between a video frame and adjacent video frames, a second stable frame from video frames corresponding to a second time interval before a vibration is generated by closing the door. Similarly, the second stable frame can be selected from the video frames captured in a period before a vibration is generated by closing the door, to ensure clarity of the picture.

Because the visual vending machine compares a picture captured before the user takes a product and a picture captured after the user takes a product to determine the product the user has taken, a smaller position difference value between the two pictures indicates a higher accuracy of product recognition. Therefore, in order to improve the accuracy of product recognition by the visual vending machine, the second stable frame can be determined, based on position offset values between a video frame and adjacent video frames, from the video frames corresponding to the second time interval before a vibration is generated by closing the door. A smaller position offset value between the selected second stable frame and the first stable frame indicates that the second stable frame is closer to the first stable frame; and in this case, the accuracy of product recognition can be increased.

In some implementations of the present application, after the to-be-processed video stream is obtained, the position offset value between adjacent video frames in the to-be-processed video stream can be calculated, and then a curve of the position offset values and time is generated in a coordinate system. Because the curve can intuitively reflect the generation time and position offset values that correspond to the video frame, the curve can be used to determine the first stable frame and the second stable frame.

Figure 2:
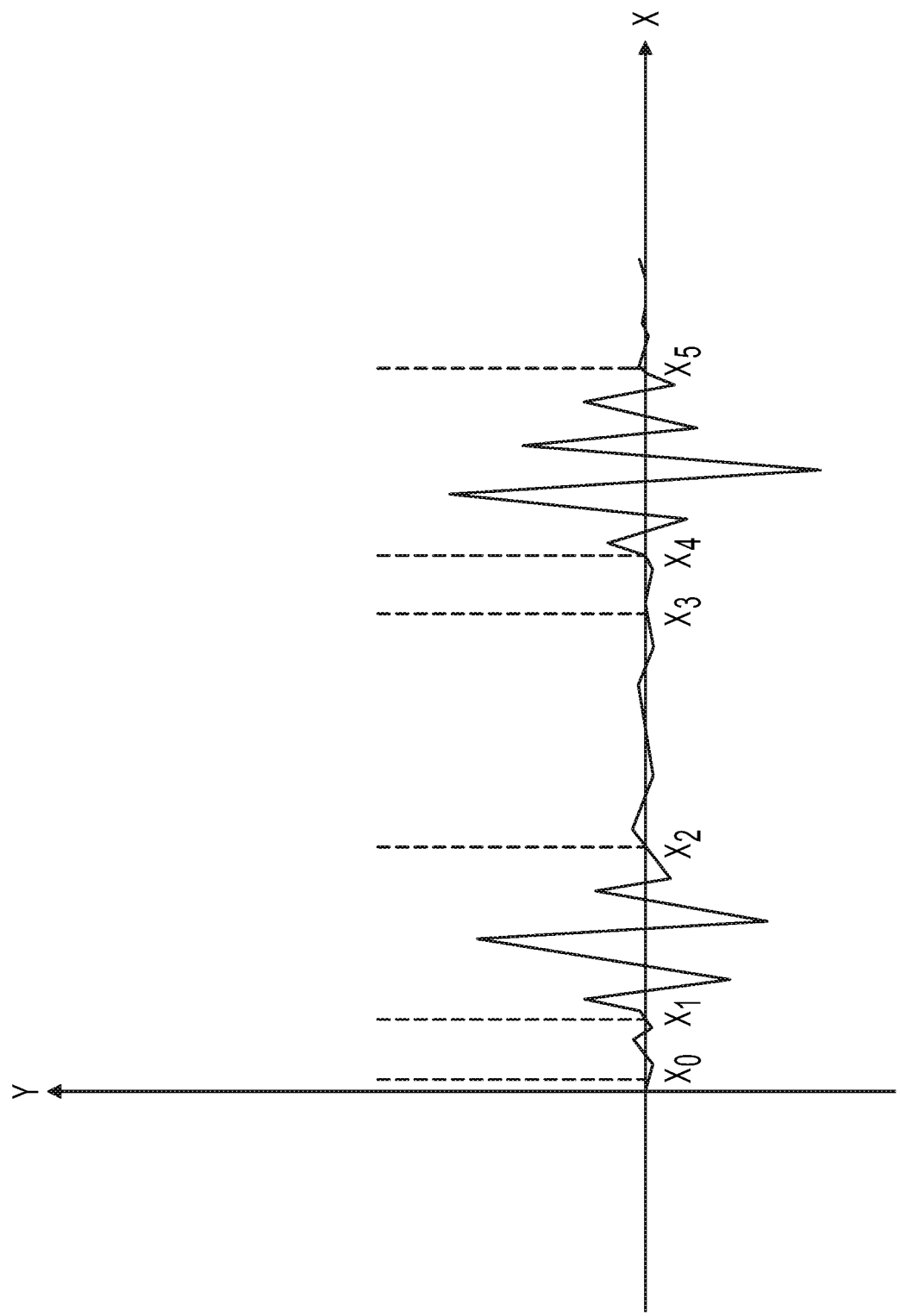
FIG. 2 is a schematic diagram illustrating a curve about position offset values and time generated in an implementation of the present application.

FIG. 2 is a schematic diagram illustrating a curve generated in an implementation of the present application, where x axis indicates time and y axis indicates position offset values between frames. It can be seen from this curve that the polygonal line corresponding to the time interval $[x_1, x_2]$ is the door-opening vibration wave band, which corresponds to a vibration generated when the door is opened; and the polygonal line corresponding to the time interval $[x_4, x_5]$ is the door-closing vibration wave band, which corresponds to a vibration generated when the door is closed. In an actual scenario, the door-opening vibration band usually lasts 1-3 seconds, and the door-closing vibration band may last 3-8 seconds.

Based on this curve, a video frame on the left side of the interval $[x_1, x_2]$ that has a smallest position difference value from the positions of adjacent video frames can be determined as the first stable frame. In an actual scenario, in order to ensure that an image can be captured when the user opens the door, the time of the first stable frame should be as close as possible to the time the user opens the door. Therefore, a video frame on the left side of the first interval $[x_0, x_1]$ (to the left of that $[x_1, x_2]$) that has a smallest position offset value from adjacent video frames needs to be found, for example, the video frame corresponding to $x_{f1}$ in the figure. Similarly, a video frame on the left side of the interval $[x_4, x_5]$ that has a smallest difference value from the position of the first stable frame can be determined as the second stable frame. That is, a video frame on the left side of the second interval $[x_3, x_4]$ (to the left of that $[x_4, x_5]$) that has a smallest position offset value from the first stable frame needs to be found, for example, the video frame corresponding to $x_{f2}$ in the figure.

The visual vending machine usually includes a sensor for recognizing door-opening action and a door-closing action, and the sensor can be used to generate a door-opening signal and a door-closing signal. Therefore, in some implementations of the present application, the door-opening signal and the door-closing signal that are generated by the sensor can be used to determine the first time interval and the second time interval more accurately, so that the stable frames extracted in the two time intervals better satisfy the requirements of image recognition, thereby improving the accuracy of recognition.

Figure 3:
FIG. 3 is a schematic diagram illustrating a first time interval and a second time interval, according to an implementation of the present application.

When the user opens the door of the visual vending machine, the sensor detects the door-opening action and generates the corresponding door-opening signal. Similarly, when the user closes the door of the visual vending machine, the sensor detects the door-closing action and generates the corresponding door-closing signal. The execution device in this solution can obtain the generated door-opening signal and door-closing signal of the visual vending machine; and then determine, based on a predetermined first duration and by using the time point corresponding to the door-opening signal as an interval ending point, the first time interval before the door-opening vibration is generated; or determine, based on a predetermined second duration and by using the time point corresponding to the door-closing signal as an interval ending point, the second time interval before the door-closing vibration is generated For example, in this implementation of the present application, if the predetermined first duration is set to 1.000 seconds, and the time point b corresponding to the door-opening signal is 00: 02: 500, the first time interval is one second between a time point a (00: 01: 500) and a time point b (00: 02: 500). If the predetermined second duration is 1.500 seconds, and the time point d corresponding to the door-closing signal is 00: 11: 500, the second time interval is 1.5 seconds between a time point c (00: 10: 000) and a time point b (00: 11: 500), as shown in FIG. 3.

In addition to the position offset value, the first stable frame and the second stable frame can be determined based on the difference value between the time point corresponding to the video frame and the interval ending point. A smaller difference value between the corresponding time point and the interval ending point (that is, the time when the door-opening signal or the door-closing signal is generated) indicates that the selected video frame is closer to the door-opening time or the door-closing time, and the captured pictures (that is, the picture captured when the door-opening signal is generated and the picture captured when the door-closing signal is generated) are more applicable for product recognition by the visual vending machine.

As such, in some implementations of the present application, the first stable frame can be determined, based on the position offset value between the video frame and adjacent video frames, and the difference value between the time point corresponding to the video frame and the first interval ending point, from the video frames corresponding to the first time interval before a vibration is generated by opening the door. In an actual scenario, different weights can be set for the position offset value and the time difference value, to affect the selection result of the stable frame. For example, the weight of the position offset value can be set to A, and the weight of the time difference value can be set to B. The weighted calculation can be performed based on the weights to obtain the comprehensive evaluation value of each video frame in the first time interval, and then the video frame with a smallest comprehensive evaluation value is selected as the first stable frame.

Similarly, the second stable frame can be determined based on the position offset value between the video frame and the first stable frame, and based on the difference value between the time point corresponding to the video frame and the second interval ending point, from the video frames corresponding to the second time interval before a vibration is generated by closing the door. For example, if the weight of the position offset value between the video frame and the first stable frame is set to C, and the weight of the difference value between the time point corresponding to the video frame and the second interval ending point is set to D, the comprehensive evaluation value of each video frame in the second time interval can be calculated by performing weighted calculation based on the weights, and the video frame with a smallest comprehensive evaluation value is selected as the second stable frame.

In an actual scenario, the visual vending machine needs to obtain a stable frame for image recognition only when a user purchases a product by using a visual vending machine. If all the video streams captured by the camera device are processed as to-be-processed video streams, many invalid processing operations will be performed. In some implementations of the present application, the stable frame is determined from video frames corresponding to the first time interval and the second time interval. Therefore, the to-be-processed video streams include at least a video frame corresponding to the first time interval and a video frame corresponding to the second time interval, so that a stable frame applicable for product recognition can be obtained.

As such, in some implementations of the present application, a triggering condition can be detected when a to-be-processed video stream is obtained. When a triggering condition is detected, to-be-processed video streams are extracted from video streams captured by the camera device, where the to-be-processed video streams include at least a video frame corresponding to the first time interval and a video frame corresponding to the second time interval. In an actual scenario, a specific position in the lens of a camera device can be set as a triggering position based on a user's habit of using a visual vending machine. Therefore, a triggering condition can be set to be that a user enters a triggering position in the lens of the camera device. For example, if the camera device faces the front of the visual vending machine, when the user takes a product, the user needs to stand in the front of the visual vending machine. In this case, the position can be set to the triggering position, and when it is detected that the user enters the triggering position, the to-be-processed video streams can be obtained for subsequent processing.

Based on a same inventive concept, an implementation of the present application further provides a device for obtaining a stable frame. A method corresponding to the device is the method for obtaining a stable frame in the previous implementation, and a problem resolution principle of the device is similar to that of the method.

According to the device for obtaining a stable frame provided in some implementations of the present application, hardware of a visual vending machine does not need to be modified, and only methods of obtaining pictures for image recognition is changed. In captured video streams, two stable frames that are respectively captured before the door of the visual vending machine is opened and closed are used as the pictures for image recognition, so that the clarity of the pictures is not affected by the door vibration generated when the door is opened or closed, and the accuracy of product recognition is improved. In addition, hardware modification is not required, so that the hardware costs are reduced.

In an actual scenario, the execution device of the previous method can be any device that has a data processing function, for example, a processor, a processing chip, a processing module, etc. of a visual vending machine. The execution device can obtain a video stream from a camera device of the visual vending machine, extract a stable frame for image recognition from the camera device, and provide the video frame to a product recognition module on the visual vending machine, so as to implement normal functions of the visual vending machine.

Figure 4:
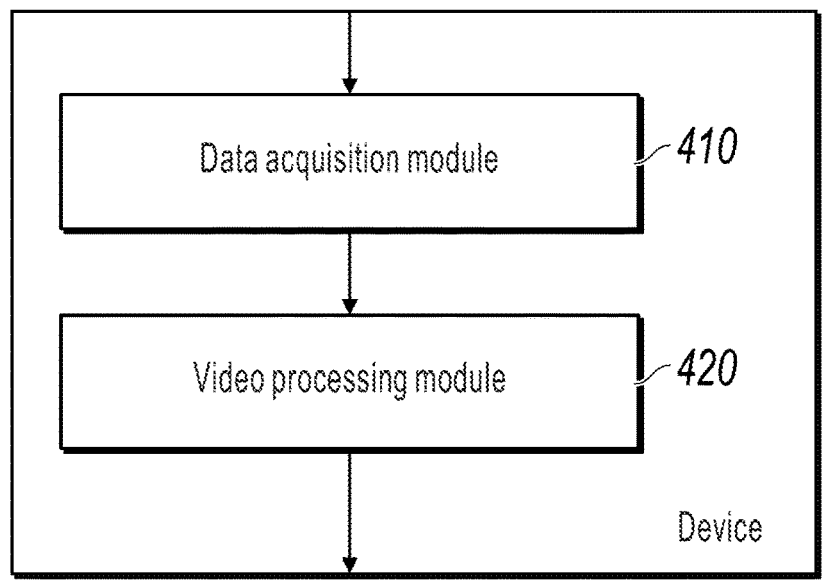
FIG. 4 is a schematic structural diagram illustrating a device for obtaining a stable frame, according to an implementation of the present specification.

FIG. 4 is a schematic structural diagram illustrating a device for obtaining a stable frame, according to an implementation of the present specification. The device includes at least a data acquisition module 410 and a video processing module 420. The data acquisition module 410 is configured to obtain a to-be-processed video stream. The video processing module 420 is configured to: determine, based on position offset values between a video frame and adjacent video frames, a first stable frame from video frames corresponding to a first time interval before a vibration is generated by opening the door; and determine, based on position offset values between a video frame and adjacent video frames, a second stable frame from video frames corresponding to a second time interval before a vibration is generated by closing the door.

A to-be-processed video stream can be video data captured by a camera device on a visual vending machine, and includes a plurality of video frames. A video frame refers to a picture related to time information, and a plurality of consecutive video frames form a video stream. For example, if the frame rate of the video stream is 25 FPS, it indicates that the video stream includes 25 video frames per second, with an interval of 0.04 seconds between video frames.

Because the objective of the present implementation is to obtain a stable frame for image recognition, the to-be-processed streams also need to include pictures applicable for image recognition, that is, two pictures that can be compared to determine the product that the user has taken. Based on the conventional usage of the visual vending machine, a picture before and after the user opens the door of the visual vending machine can be captured, and another picture before and after the user closes the door of the visual vending machine can be captured; and then the two pictures can be compared to determine the product that the user has taken. As such, the to-be-processed video streams need to include at least a video frame corresponding to the time interval before and after the user opens the door of the visual vending machine and another video frame corresponding to the time interval before and after the user closes the door of the visual vending machine, so as to obtain two recognition pictures (that is, a first stable frame and a second stable frame).

After the user opens the door of the visual vending machine, the door will vibrate because of its contact with the cabinet of the visual vending machine, and then the camera device on the visual vending machine will vibrate, and consequently, the position of the captured video frame will be different. The position offset value is a value representing a position difference value between two video frames. A larger position offset value between video frames indicates a stronger vibration of the camera device; and in this case, the clarity of the captured video frames is decreased accordingly. As such, the video processing module can obtain the first stable frame from the video frames captured in a period before a vibration is generated by opening the door, to ensure clarity of the picture.

In an actual scenario, in addition to opening or closing of a door, the visual vending machine may also vibrate due to other reasons, for example, when a large vehicle is passing by, when the wind is strong, etc. Therefore, when the first stable frame is determined from the video frames corresponding to the first time interval before a vibration is generated by opening the door, the video processing module can select a video frame with a smallest offset value between the video frame and adjacent video frames as the first stable frame.

Similarly, the video processing module can obtain the second stable frame from the video frames captured in a period before a vibration is generated by closing the door, to ensure clarity of the picture.

Because the visual vending machine compares a picture captured before the user takes a product and a picture captured after the user takes a product to determine the product the user has taken, a smaller position difference value between the two pictures a higher accuracy of product recognition. Therefore, in order to improve the accuracy of product recognition by the visual vending machine, the video processing module can determine, based on position offset values between a video frame and adjacent video frames, the second stable frame from the video frames corresponding to the second time interval before a vibration is generated by closing the door. A smaller position offset value between the selected second stable frame and the first stable frame indicates that the second stable frame is closer to the first stable frame; and in this case, the accuracy of product recognition can be increased.

In some implementations of the present application, after the to-be-processed video streams are obtained, the video processing module can calculate the position offset value between adjacent video frames in the to-be-processed video streams, and then generate a curve about the position offset value and time in a coordinate system. Because the curve can intuitively reflect the generation time and position offset value that correspond to the video frame, the curve can be used to determine the first stable frame and the second stable frame.

FIG. 2 is a schematic diagram illustrating a curve generated in an implementation of the present application, where x axis indicates time and y axis indicates position offset values between frames. It can be seen from this curve that the polygonal line corresponding to the time interval $[x_1, x_2]$ is the door-opening vibration wave band, which corresponds to a vibration generated when the door is opened; and the polygonal line corresponding to the time interval $[x_4, x_5]$ is the door-closing vibration wave band, which corresponds to a vibration generated when the door is closed. In an actual scenario, the door-opening vibration band usually lasts 1-3 seconds, and the door-closing vibration band may last 3-8 seconds.

Based on this curve, the video processing module can determine a video frame on the left side of the interval $[x_1, x_2]$ that has a smallest position difference value from the positions of adjacent video frames as the first stable frame. In an actual scenario, in order to ensure that an image can be captured when the user opens the door, the time of the first stable frame should be as close as possible to the time the user opens the door. Therefore, a video frame on the left side of the first interval $[x_0, x_1]$ (to the left of that $[x_1, x_2]$) has a smallest position offset value from adjacent video frames needs to be found, for example, the video frame corresponding to $x_{f1}$ in the figure. Similarly, a video frame on the left side of the interval $[x_4, x_5]$ that has a smallest difference value from the position of the first stable frame can be determined as the second stable frame. That is, a video frame on the left side of the second interval $[x_3, x_4]$ (to the left of that $[x_4, x_5]$) has a smallest position offset value from the first stable frame needs to be found, for example, the video frame corresponding to $x_{f2}$ in the figure.

The visual vending machine usually includes a sensor for recognizing a door-opening action and a door-closing action, and the sensor can be used to generate a door-opening signal and a door-closing signal. Therefore, in some implementations of the present application, the door-opening signal and the door-closing signal that are generated by the sensor can be used to determine the first time interval and the second time interval more accurately, so that the stable frames extracted in the two time intervals better satisfy the requirements of image recognition, thereby improving the accuracy of recognition.

When the user opens the door of the visual vending machine, the sensor detects the door-opening action and generates the corresponding door-opening signal. Similarly, when the user closes the door of the visual vending machine, the sensor detects the door-closing action and generates the corresponding door-closing signal. The execution device in this solution can obtain the generated door-opening signal and door-closing signal of the visual vending machine; and then determine, based on a predetermined first duration and by using the time point corresponding to the door-opening signal as an interval ending point, the first time interval before the door-opening vibration is generated; or determine, based on a predetermined second duration and by using the time point corresponding to the door-closing signal as an interval ending point, the second time interval before the door-closing vibration is generated For example, in some implementations of the present application, if the predetermined first duration is set to 1.000 seconds, and the time point b corresponding to the door-opening signal is 00: 02: 500, the first time interval is one second between a time point a (00: 01: 500) and a time point b (00: 02: 500). If the predetermined second duration is 1.500 seconds, and the time point d corresponding to the door-closing signal is 00: 11: 500, the second time interval is 1.5 seconds between a time point c (00: 10: 000) and a time point b (00: 11: 500), as shown in FIG. 3.

In addition to the position offset value, the video processing module can determine the first stable frame and the second stable frame based on the difference value between the time point corresponding to the video frame and the interval ending point. A smaller difference value between the corresponding time point and the interval ending point (that is, the time when the door-opening signal or the door-closing signal is generated) indicates that the selected video frame is closer to the door-opening time or the door-closing time, and the captured pictures (that is, the picture captured when the door-opening signal is generated and the picture captured when the door-closing signal is generated) are more applicable for product recognition by the visual vending machine.

As such, in some implementations of the present application, the video processing module can determine, based on the position offset values between the video frame and adjacent video frames, and the difference value between the time point corresponding to the video frame and the first interval ending point, the first stable frame from the video frames corresponding to the first time interval before a vibration is generated by opening the door. In an actual scenario, different weights can be set for the position offset value and the time difference value, to affect the selection result of the stable frame. For example, the weight of the position offset value can be set to A, and the weight of the time difference value can be set to B. The weighted calculation can be performed based on the weights to obtain the comprehensive evaluation value of each video frame in the first time interval, and then the video frame with a smallest comprehensive evaluation value is selected as the first stable frame.

Similarly, the video processing module can determine, based on the position offset value between the video frame and the first stable frame, and based on the difference value between the time point corresponding to the video frame and the second interval ending point, the second stable frame from the video frames corresponding to the second time interval before a vibration is generated by closing the door. For example, if the weight of the position offset value between the video frame and the first stable frame is set to C, and the weight of the difference value between the time point corresponding to the video frame and the second interval ending point is set to D, the comprehensive evaluation value of each video frame in the second time interval can be calculated by performing weighted calculation based on the weights, and the video frame with a smallest comprehensive evaluation value is selected as the second stable frame.

In an actual scenario, the visual vending machine needs to obtain a stable frame for image recognition only when a user purchases a product by using a visual vending machine. If all the video streams captured by the camera device are processed as to-be-processed video streams, many invalid processing operations will be performed. In some implementations of the present application, the stable frame is determined from video frames corresponding to the first time interval and the second time interval. Therefore, the to-be-processed video streams include at least a video frame corresponding to the first time interval and a video frame corresponding to the second time interval, so that a stable frame applicable for product recognition can be obtained.

As such, in some implementations of the present application, the data acquisition module can detect a triggering condition when to-be-processed video streams are obtained. When a triggering condition is detected, the data acquisition module can extract to-be-processed video streams from video streams captured by the camera device, where the to-be-processed video stream includes at least a video frame corresponding to the first time interval and a video frame corresponding to the second time interval. In an actual scenario, a specific position in the lens of a camera device can be set as a triggering position based on a user's habit of using a visual vending machine. Therefore, a triggering condition can be set to be that a user enters a triggering position in the lens of the camera device. For example, if the camera device faces the front of the visual vending machine, when the user takes a product, the user needs to stand in the front of the visual vending machine. In this case, the position can be set to the triggering position, and when it is detected that the user enters the triggering position, the to-be-processed video stream can be obtained for subsequent processing.

Figure 5:
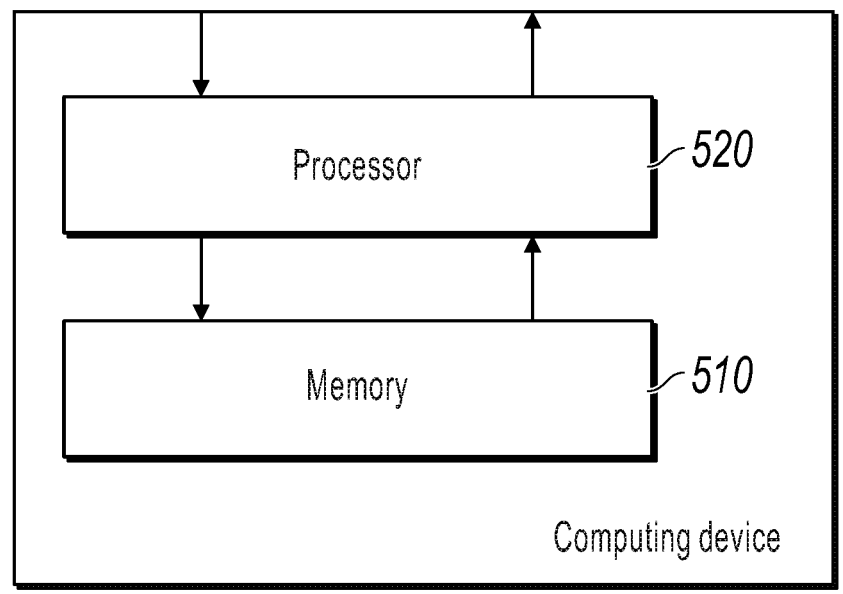
FIG. 5 is a schematic structural diagram illustrating a computing device for implementing the technical solutions of the implementations of the present application, according to an implementation of the present application.

In addition, a part of the present application can be implemented as computer program products, for example, a computer program instruction. When the computer program instruction is executed by a computer, the methods and/or the technical solutions according to the present application can be invoked or provided through operations of the computer. In addition, the program instruction for invoking the method in the present application can be stored in a fixed or removable recording medium, and/or is transmitted through broadcast or a data flow in other signal bearer media, and/or is stored in an operating memory of a computer device that operates based on the program instruction. Here, some implementations of the present application include a computing device as shown in FIG. 5. The device includes one or more memories 510, configured to store computer-readable instructions, and a processor 520, configured to execute the computer-readable instructions, where when the computer-readable instructions are executed by the processor, the device is enabled to perform the method and/or technical solutions based on the previous implementations of the present application.

In addition, in some implementations of the present application, a computer readable medium is further provided, where the computer readable medium stores computer program instructions that can be executed by a processor to implement the methods and/or technical solutions according to the previous implementations of the present application.

It is worthwhile to note that the present application can be implemented by software and/or a combination of software and hardware, for example, an application specific integrated circuit (ASIC), a general purpose computer, or any other similar hardware device. In some implementations, the software program of the present application can be executed by a processor to implement the previous steps or functions. Similarly, the software program of the present application (including a related data structure) can be stored in a computer readable recording medium, for example, a RAM, a magnetic or optical drive, or a floppy disk. In addition, some of the steps or functions of the present application can be implemented by hardware, for example, as a circuit that cooperates with the processor to perform various steps or functions.

It is clear to a person skilled in the art that the present application is not limited to the details of the example implementations described above, and that the present application can be implemented in other specific forms without departing from the spirit or basic features of the present application. Therefore, from any point of view, the implementations should be considered examples and non-limiting, and the scope of the present application is limited by the appended claims rather than the previous description, and therefore all changes that fall within the meaning and scope of the equivalents of the claims are intended to be encompassed within the present application. Any reference numerals in the claims shall not be construed as limiting the claims to which they relate. In addition, it is clear that the term "include" does not preclude other units or steps, and a singular form does not preclude a plural form. The plurality of units or devices described in the claims of the device can also be implemented by a unit or device by using software or hardware. Words such as "first" and "second" are used to represent names rather than any particular order.

What is claimed is:

1. A computer-implemented method for obtaining a stable frame comprising:
   obtaining a video stream, wherein the video stream comprises a plurality of video frames;
   determining, based on position offset values between a first video frame and video frames adjacent to the first video frame, a first stable frame from video frames corresponding to a first time interval before a first vibration is generated by opening a door of a visual vending machine; and
   determining, based on a position offset value between a second video frame and the first stable frame, a second stable frame from video frames corresponding to a second time interval after the first vibration and before a second vibration is generated by closing the door of the visual vending machine.

2. The computer-implemented method of claim 1, further comprising:
   obtaining a door-opening signal and a door-closing signal of the visual vending machine; and
   determining, based on a predetermined first duration and by using a time point corresponding to the door-opening signal as a first interval ending point, the first time interval before the first vibration is generated; or
   determining, based on a predetermined second duration and by using a time point corresponding to the door-closing signal as a second interval ending point, the second time interval before the second vibration is generated.

3. The computer-implemented method of claim 1, wherein determining the first stable frame comprises:
calculating the position offset values between the first video frame and the video frames adjacent to the first video frame;
calculating a first time difference value between a first time point corresponding to the first video frame and a second time point corresponding to an end of the first time interval before the first vibration is generated by opening the door of the visual vending machine; and
determining the first stable frame using the position offset values and the first time difference value.

4. The computer-implemented method of claim 1, wherein determining the second stable frame comprises:
calculating the position offset value between the second video frame and the first stable frame;
calculating a second time difference value between a third time point corresponding to the second video frame and a fourth time point corresponding to an end of the second time interval; and
determining the second stable frame using the position offset value and the second time difference value.

5. The computer-implemented method of claim 1, further comprising:
calculating position offset values between adjacent video frames in the video stream; and
generating a curve from the position offset values and time in a coordinate system, to determine the first stable frame and the second stable frame.

6. The computer-implemented method of claim 1, wherein obtaining the video stream comprises:
detecting a triggering condition; and
extracting, after detecting the triggering condition, the video stream from video streams captured by a camera device, wherein the video stream comprises at least a video frame corresponding to the first time interval and a video frame corresponding to the second time interval.

7. The computer-implemented method of claim 6, wherein the triggering condition comprises:
monitoring a first area in front of the visual vending machine; and
detecting that a user enters a triggering position, wherein the triggering position comprises the first area.

8. A non-transitory, computer-readable medium storing one or more instructions executable by a computer system to perform operations comprising:
obtaining a video stream, wherein the video stream comprises a plurality of video frames;
determining, based on position offset values between a first video frame and video frames adjacent to the first video frame, a first stable frame from video frames corresponding to a first time interval before a first vibration is generated by opening a door of a visual vending machine; and
determining, based on a position offset value between a second video frame and the first stable frame, a second stable frame from video frames corresponding to a second time interval after the first vibration and before a second vibration is generated by closing the door of the visual vending machine.

9. The non-transitory, computer-readable medium of claim 8, further comprising:
obtaining a door-opening signal and a door-closing signal of the visual vending machine; and
determining, based on a predetermined first duration and by using a time point corresponding to the door-opening signal as a first interval ending point, the first time interval before the first vibration is generated; or
determining, based on a predetermined second duration and by using a time point corresponding to the door-closing signal as a second interval ending point, the second time interval before the second vibration is generated.

10. The non-transitory, computer-readable medium of claim 8, wherein determining the first stable frame comprises:
calculating the position offset values between the first video frame and the video frames adjacent to the first video frame;
calculating a first time difference value between a first time point corresponding to the first video frame and a second time point corresponding to an end of the first time interval before the first vibration is generated by opening the door of the visual vending machine; and
determining the first stable frame using the position offset values and the first time difference value.

11. The non-transitory, computer-readable medium of claim 8, wherein determining the second stable frame comprises:
calculating the position offset value between the second video frame and the first stable frame;
calculating a second time difference value between a third time point corresponding to the second video frame and a fourth time point corresponding to an end of the second time interval; and
determining the second stable frame using the position offset value and the second time difference value.

12. The non-transitory, computer-readable medium of claim 8, further comprising:
calculating position offset values between adjacent video frames in the video stream; and
generating a curve from the position offset values and time in a coordinate system, to determine the first stable frame and the second stable frame.

13. The non-transitory, computer-readable medium of claim 8, wherein obtaining the video stream comprises:
detecting a triggering condition; and
extracting, after detecting the triggering condition, the video stream from video streams captured by a camera device, wherein the video stream comprises at least a video frame corresponding to the first time interval and a video frame corresponding to the second time interval.

14. The non-transitory, computer-readable medium of claim 13, wherein the triggering condition comprises:
monitoring a first area in front of the visual vending machine; and
detecting that a user enters a triggering position, wherein the triggering position comprises the first area.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining a video stream, wherein the video stream comprises a plurality of video frames;

determining, based on position offset values between a first video frame and video frames adjacent to the first video frame, a first stable frame from video frames corresponding to a first time interval before a first vibration is generated by opening a door of a visual vending machine; and determining, based on a position offset value between a second video frame and the first stable frame, a second stable frame from video frames corresponding to a second time interval after the first vibration and before a second vibration is generated by closing the door of the visual vending machine.

16. The computer-implemented system of claim 15, further comprising:

obtaining a door-opening signal and a door-closing signal of the visual vending machine; and determining, based on a predetermined first duration and by using a time point corresponding to the door-opening signal as a first interval ending point, the first time interval before the first vibration is generated; or determining, based on a predetermined second duration and by using a time point corresponding to the door-closing signal as a second interval ending point, the second time interval before the second vibration is generated.

17. The computer-implemented system of claim 15, wherein determining the first stable frame comprises:

calculating the position offset values between the first video frame and the video frames adjacent to the first video frame;

calculating a first time difference value between a first time point corresponding to the first video frame and a second time point corresponding to an end of the first time interval before the first vibration is generated by opening the door of the visual vending machine; and determining the first stable frame using the position offset values and the first time difference value.

18. The computer-implemented system of claim 15, wherein determining the second stable frame comprises:

calculating the position offset value between the second video frame and the first stable frame;

calculating a second time difference value between a third time point corresponding to the second video frame and a fourth time point corresponding to an end of the second time interval; and determining the second stable frame using the position offset value and the second time difference value.

19. The computer-implemented system of claim 15, further comprising:

calculating position offset values between adjacent video frames in the video stream; and generating a curve from the position offset values and time in a coordinate system, to determine the first stable frame and the second stable frame.

20. The computer-implemented system of claim 15, wherein obtaining the video stream comprises:

detecting a triggering condition; and extracting, after detecting the triggering condition, the video stream from video streams captured by a camera device, wherein the video stream comprises at least a video frame corresponding to the first time interval and a video frame corresponding to the second time interval.

* * * * *